United States Patent [19]

Leard et al.

[11] Patent Number: 5,196,767
[45] Date of Patent: Mar. 23, 1993

[54] SPATIAL LIGHT MODULATOR ASSEMBLY

[75] Inventors: Francis L. Leard, Sudbury; Todd N. Tsakiris; Cardinal Warde, both of Newtonville, all of Mass.

[73] Assignee: Optron Systems, Inc., Bedford, Mass.

[21] Appl. No.: 638,317

[22] Filed: Jan. 4, 1991

[51] Int. Cl.⁵ .................................. G02F 1/13
[52] U.S. Cl. ............................ 315/349; 315/169.1; 313/309; 359/245
[58] Field of Search .............. 315/349, 169.1; 313/309, 336; 359/245, 291

[56] References Cited

U.S. PATENT DOCUMENTS

| | | | |
|---|---|---|---|
| 3,909,116 | 9/1975 | Kohashi | 359/291 X |
| 4,481,531 | 11/1984 | Warde et al. | 250/213 R X |
| 4,685,763 | 8/1987 | Tada et al. | 359/245 X |
| 4,710,732 | 12/1987 | Hornbeck | 359/291 X |
| 4,794,296 | 12/1988 | Warde et al. | 250/332 X |
| 4,800,263 | 1/1989 | Dillon et al. | 250/213 R X |
| 4,941,735 | 7/1990 | Moddel et al. | 250/213 |

FOREIGN PATENT DOCUMENTS

| | | | |
|---|---|---|---|
| 0179316 | 7/1988 | Japan | 359/245 |
| 0179317 | 7/1988 | Japan | 359/245 |

OTHER PUBLICATIONS

"Microchannel Spatial Light Modulator", by C. Warde et al, Optic Letters, vol. 3, No. 5, Nov. 1978, pp. 196-198.

Primary Examiner—Eugene R. LaRoche
Assistant Examiner—Son Dinh
Attorney, Agent, or Firm—Hayes, Soloway, Hennessey & Hage

[57] ABSTRACT

The disclosed optical signal processor includes a matrix-addressable field emitter array for supplying a controlled electron emission to a two-dimensional signal processor element that may be either a processor of electrical or two-dimensional optical signals.

21 Claims, 3 Drawing Sheets

SPATIAL LIGHT MODULATOR ASSEMBLY

FIELD OF THE INVENTION

The present invention is directed to the field of optical signal processing, and more particularly, to a novel matrix-addressable field emitter array spatial light modulator assembly. The invention has particular utility as part of an optical spatial light processor and will be described in connection with such utility, although other utilities are contemplated.

BACKGROUND OF THE INVENTION

Optical systems have the ability to perform parallel signal processing at ultra-high speeds, and therefore offer significant potential for computer applications. However, high speed, reusable spatial light modulators are badly needed to take full advantage of parallel optical signal processing at high speeds. Unfortunately, the development of viable optical computing devices has been slow. The most basic and therefore critical optical component is the spatial light modulator. While significant advances have been made in the design of spatial light modulators (see, for example, U.S. Pat. Nos. 4,481,531; 4,794,296; 4,800,263; 4,822,993; 4,851,659; and 4,863,759), few designs have reached the commercialization stage, and none of the prior art designs are especially well suited for the demand, performance and harsh environments, for example, of military applications. The heretofore known devices and technologies have been deficient in one or more of the foregoing and other aspects.

OBJECTS OF THE INVENTION

It is thus an object of the present invention to overcome the aforesaid and other deficiencies of the prior art.

SUMMARY OF THE INVENTION

In accordance with the present invention, there is provided a novel, electrically addressable, spatial light modulator having a matrix-addressable field emitter array as the electron source. In one embodiment of the invention, the field emitter array spatial light modulator includes an enclosure defining a vacuum chamber, and including a matrix-addressable field emitter array, a stabilization grid and an output signal processing element. The field emitter array, the stabilization grid and the bottom surface of the output signal processing element are all housed within the vacuum chamber. Alternatively, the output signal processing element may be positioned partially within the vacuum chamber, or accessed through a transparent window. In yet another embodiment of the invention, the output signal processing element may comprise a charge transfer plate, for example, of the type described by Warde and Dillon U.S. Pat. No. 4,794,296 assigned to the common assignee, as a substrate for supporting any one of a multiple of optical materials and structures used for manipulating light.

BRIEF DESCRIPTION OF THE DRAWINGS

These and other features and attendant advantages of the present invention will become better understood by reference to the following detailed description of the preferred embodiment thereof, and to the drawings, wherein like numerals depict like parts, and in which.

DETAILED DESCRIPTION OF THE INVENTION

Figure 1:
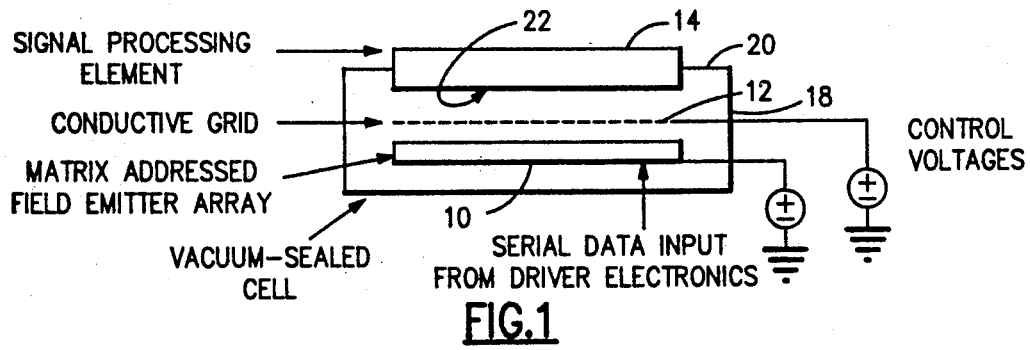
FIG. 1 is a diagrammatic view of a first embodiment of a field emitter array spatial light modulator and signal processor according to the present invention.
Figure 5:
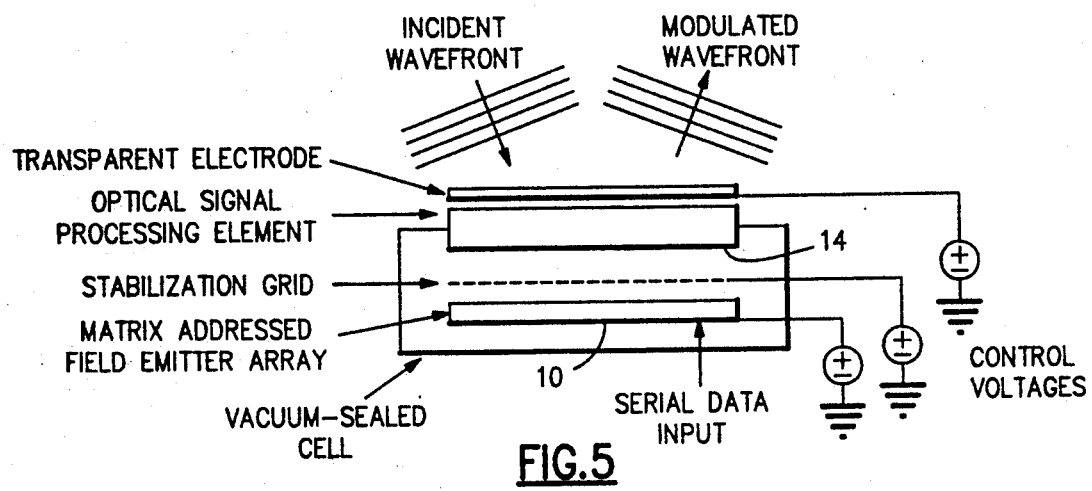
FIG. 5 is a view, similar to FIG. 1, of yet another alternative field emitter array spatial light modulator and signal processor according to the present invention.
Figure 6:
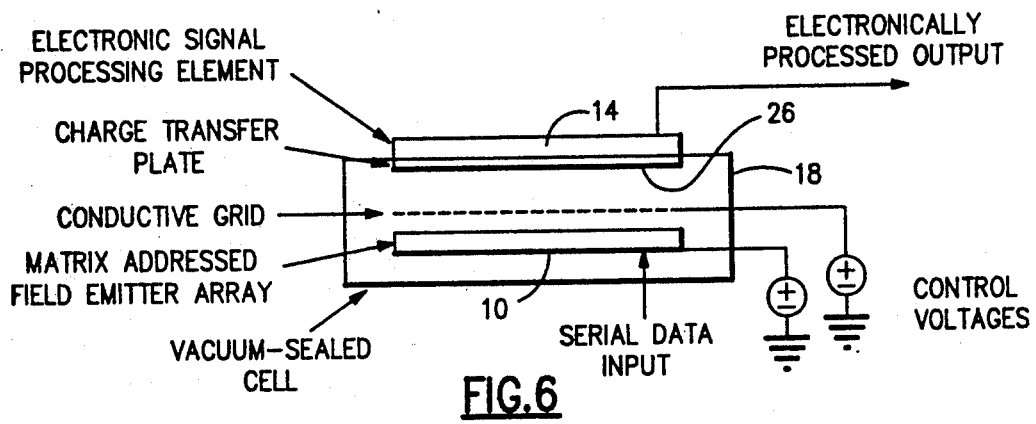
FIG. 6 is a view, similar to FIG. 1, illustrating yet another alternative field emitter array spatial light modulator and signal processor according to the present invention.
Figure 2:
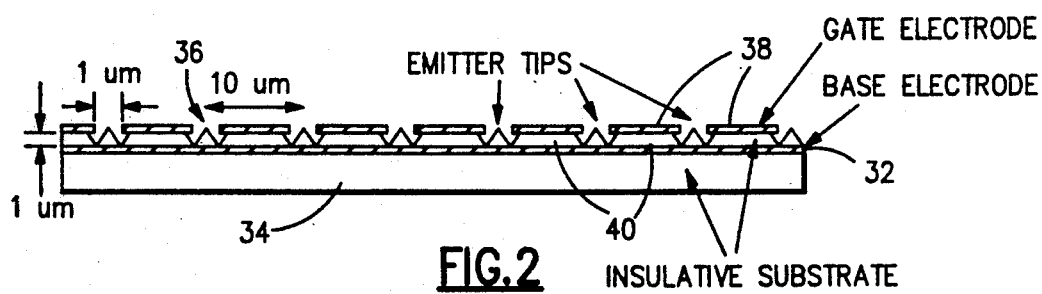
FIG. 2 is a side elevational view, in cross section, of a field emitter array portion of the signal processor according to the present invention.
Figure 3:
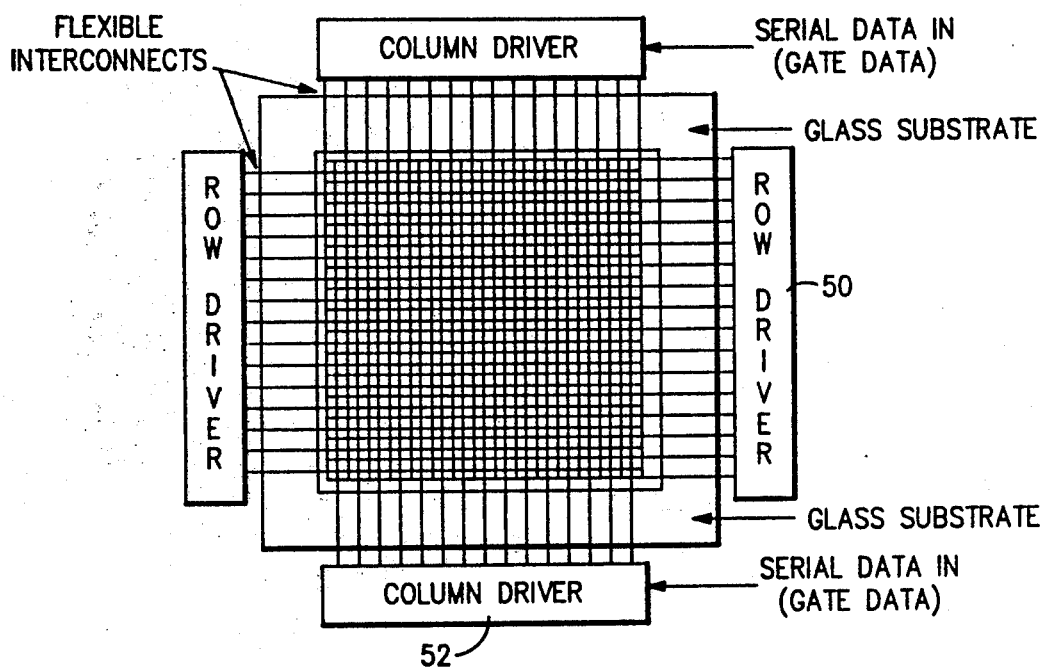
FIG. 3 is a diagrammatic top plan view of the field emitter array portion of the signal processor according to the present invention.
Figure 4:
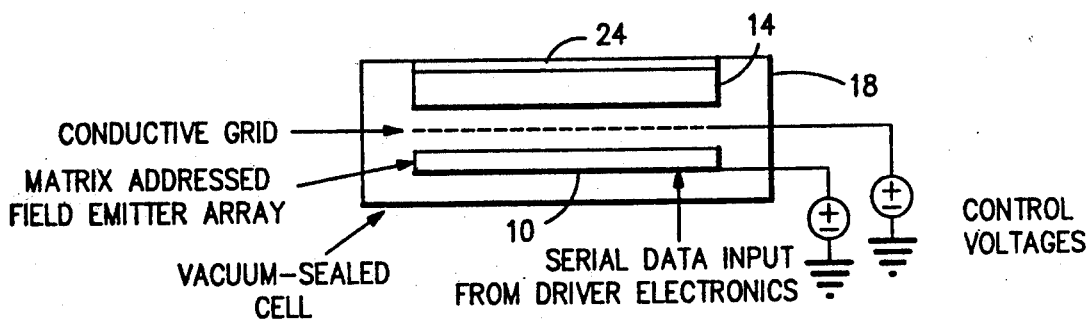
FIG. 4 is a view, similar to FIG. 1, illustrating an alternative embodiment of field emitter array spatial light modulator and signal processor according to the present invention.

Referring now to FIGS. 1, 2 and 3, the field emitter array spatial light modulator and signal processor of the present invention comprises a matrix addressed field emitter array 10 with driver electronics of conventional construction, an electrically conductive stabilization grid 12, and an output signal processing element 14. The field emitter array 10, and the stabilization grid 12 are electrically isolated from one another and are housed within a vacuum chamber or cell 18. The output signal processing element 14 is positioned within an output port 20 located within a wall of vacuum cell 18, with its bottom surface 22 located within vacuum cell 18 and facing grid 12. Alternatively, as seen in FIG. 4, the output signal processing element 14 may be located entirely within cell 18 and accessed through a transparent window 24. In yet another embodiment of the invention, the output signal processing element 14 may comprise a single material, such as an inorganic crystal or organic polymer, or it may have a more complex structure such as a liquid crystal cell or a deformable mirror stretched across an appropriate supporting structure as shown in FIG. 5. The output signal processing element 14 may be located external to the vacuum cell 18 and coupled with access through a charge transfer plate 26 located in the wall of vacuum cell 18 as shown in FIG. 6.

Referring to FIG. 2, the matrix addressed field emitter array 10 useful in the signal processor of the present invention is of conventional construction, and comprises an array of gated micro- or emitter-tips that source electrons via field emission. More particularly, the field emitter array comprises an array of cones 30 on a base electrode 32 which in turn is mounted on a rigid insulative substrate 34. The emitter cones 30, and base electrode 32 which supplies them with electrons may be made of a metal, a semi-conductor or a mixture of the two. The insulative substrate 34 may be made of a semiconductor, a photoconductor or an insulative material such as silicon or glass, or the like. Cones 30 are arranged uniformly spaced over electrode 32, are of equal size and shape, and each terminate in emitter tips 36. An array of gate electrodes 38 is positioned between metal cones 30 and are electrically insulated from metal cones 30 by means of an insulative substrate 40. In a preferred embodiment of the invention, the emitter tips 36 are approximately one micron in diameter and are spaced at a ten micron pitch. A single base electrode contacts all of the emitters and a single gate electrode is used to vary the emission of all of the emitter tips in unison.

The field emitter arrays consist of an array of gated microtips that source electrons via field emission. Electrons are extracted from the tips of the emitters when the potential of the gate electrode is sufficiently positive. The level of emission from the tips is controlled by varying the potential difference between the base and gate electrodes. The matrix-addressed field emitter array allows X-Y addressing of different emitter tips; it is effectively a 2-D array of electron sources, or pixel sources, where the emission level of each electron source may be set independently of all others. This is accomplished by patterning the base and gate electrodes into octagonal sets of strip electrodes.

Referring to FIG. 3, the gates in a given horizontal row are connected to a common bus. Likewise, all the drains in a vertical column are connected to a common bus. Vertical scan (row addressing) is produced in known manner by sequentially driving the gate busses from the shift register, all in known manner.

Specialized driver electronics around the periphery of the field emitter array supply the needed voltages to each of the row and column electrodes in known manner. Pixel sources may be turned on (selected) one at a time or a row at a time.

Electrons emitted from the field emitter array are accelerated towards the stabilization grid 12. The potential of the interior surface of the output signal processing element can be controlled via capacitive coupling by a single or patterned transparent electrode on the exterior surface of the output signal processing element. Varying the potential of this electrode varies the potential of the interior surface of the output signal processing element, which in turn varies the secondary emission co-efficient of electrodes that reach this surface. In this way electrons may be deposited or removed according to the potential(s) of the electrode(s). Through electron deposition or removal, the voltage drop across the output signal processing element and therefore its optical or electrical properties may be controlled over a 2-D grid of pixels. The conductive stabilization grid serves to collect secondary electrons during the electron removal process.

The output signal processing element 14 may be any light modulating element whose optical properties may be varied by application of an electrical field. For example, the output signal processing element 14 may be a single material such as inorganic crystals or an organic polymer. Alternatively, optical signal processing element 14 may comprise liquid crystals or a deformable mirror stretched across an appropriate supporting structure, all as described in Warde et al U.S. Pat. No. 4,794,296, which patent is incorporated herein by reference. The optical signal to be modulated is incident on the top surface of the electro-optic (output signal processing) element and is reflected back; in the process it is modulated in phase, wave length, amplitude, polarization, depending on the nature of the output signal processing element.

Alternatively, as shown in FIG. 6, the output device 14 may comprise an array of diodes, multiplexers, electronic chips, or a VLSI or other circuit capable of performing 2-D parallel electrical signal processing, all as described in Warde et al U.S. Pat. No. 4,794,296. Like the light modulating elements, these electrical signal processing elements can be employed inside the evacuated housing with electrical connections to the exterior, incorporated into the output window, or coupled to the field emitter array via a charge transfer plate.

Figure 7:
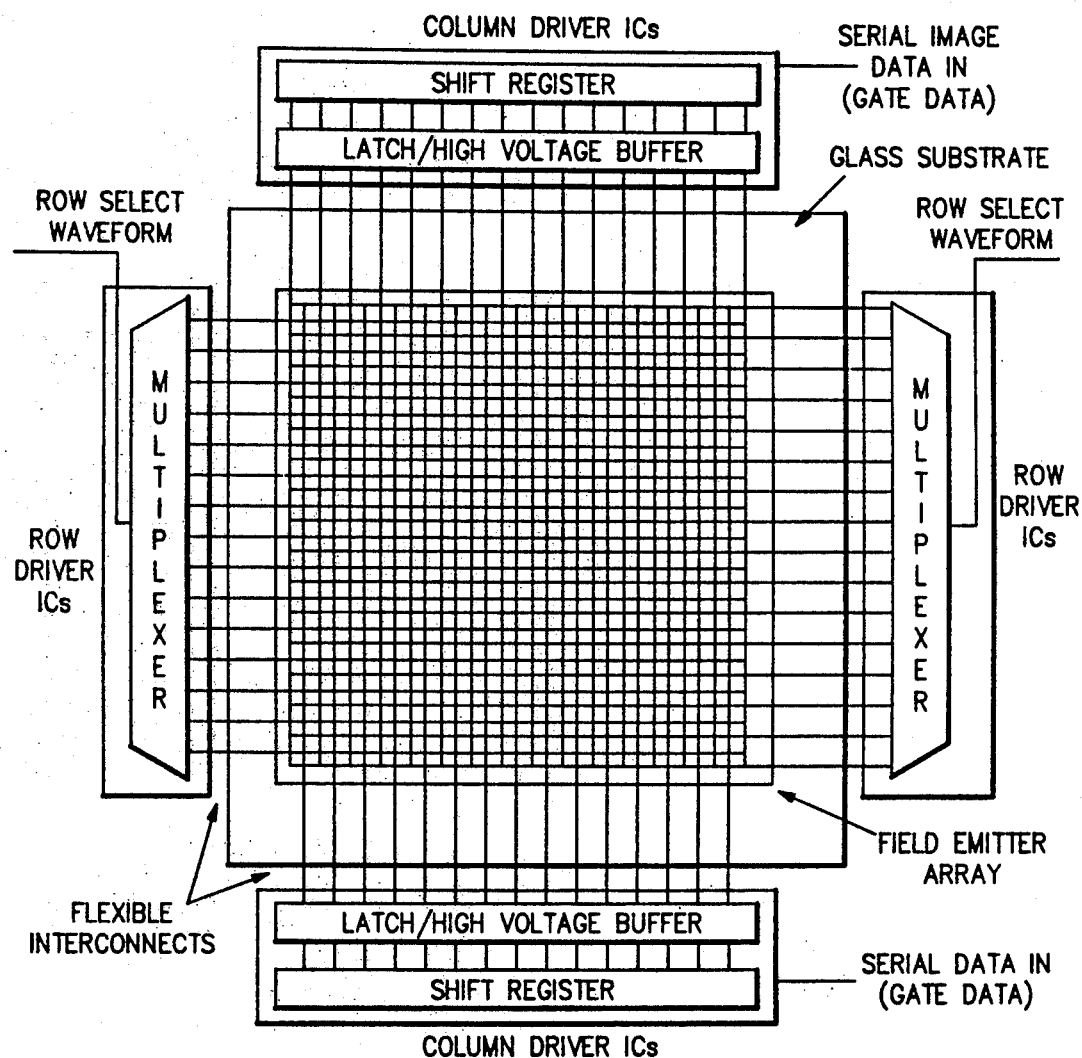
FIG. 7 is a schematic diagram showing details of the row and column drivers for the field emitter array in accordance with the present invention.

Referring to FIG. 7, to take full advantage of the parallel addressing potential of the field emitter array, the field emitter array spatial light modulator assembly of the present invention uses row-at-a-time addressing. In the row-at-a-time addressing mode, row driver electronics select a particular row by driving that row's base electrode to some negative voltage, typically −75V, while keeping all other rows inactive by maintaining on them a more positive voltage, say 0V (ground). At the same time, a vector of positive voltages corresponding to an entire row of image information is placed on the gate electrodes by the column driver electronics. Each pixel cathode in the selected row emits electrons at a level determined by the gate voltage on that pixel's column electrode. The maximum positive voltage swing placed on the column electrodes is about 60V, which creates a gate-to-base voltage of 135V, resulting in the maximum level of emission current.

Driving the field emitter array spatial light modulator assembly of the present invention requires two types of integrated circuits (ICs): row drivers and column drivers. A row driver IC consists of a multiplexer and a number of buffered high voltage outputs. A typical row driver IC has 2 high voltage output channels. An input voltage (the typical row select voltage of −75V) is sequentially multiplexed onto each successive output channels. For the field emitter array spatial light modulator assembly of the present invention, these outputs can be used to drive the row (base) electrodes. In this way, the row driver enables one row at a time. Row driver ICs may be cascaded in a manner that allows sequential selection of the rows of any size array. The ability of commercially available row driver's high voltage outputs to source and sink large currents makes these ICs well suited to driving the base electrodes of the field emitter array spatial light modulator assembly of the present invention.

Column driver ICs consist of a serial data input to an internal shift register, a latch, and usually 32 output channels each containing a high voltage amplifier and buffer. Input data is clocked into the driver IC serially. It can then be transferred to the column driver's internal latch whose outputs are amplified to drive the high voltage outputs. For the field emitter array spatial light modulator assembly of the present invention, these outputs are used to drive the column (gate) electrodes. As soon as a row of data is transferred from the internal shift register to the internal latch, clocking in of the next row of data may begin. Column drivers are available with either binary or multilevel voltage outputs. The column driver's outputs do not need the current sinking ability of the row driver's outputs, since negligible current flows to the gates of the field emitters. It is important that the clock frequency of the serial shift register be as fast as possible since this may limit the overall display rate.

The driver electronics employed are similar to those employed with commercially available electroluminescent (EL) displays, and any one of several commercially available sets of integrated circuits (ICs) can be used in the present invention. Two such commercially available row driver ICs 50 which may be used in the field emitter array spatial light modulator assembly of the present invention are the SN75551 (Texas Instruments) and the HV55 (Supertex, Inc.). Two such commercially available column drivers ICs 52 which may be used in the field emitter array spatial light modulator assembly of the present invention are the SN75555 (Texas Instruments) and the HV38 (Supertex, Inc.).

The incorporation of a field emitter array with a spatial light modulator and signal processor in accordance with the present invention provides a number of advantages over conventional thermionic cathodes and microchannel electron multipliers. These include increased current density; increased speed; reduced complexity; and, enhanced power efficiency. Moreover, due to the very short path of electrodes between the emitter and target, field emitter arrays generally do not require magnetic shielding. Also, field emitter arrays have been shown to have exceptional radiation hardness.

Various changes and modifications of the presently disclosed invention will be come apparent to those skilled in the art without departing from the scope of the invention. For example, different light modulating elements or electronic signal output devices may be selectively couplable to the output port of the electronic signal processing element and externally of the enclosure in accordance with the present invention. Depending on the type of output device selected and on the particular embodiment, the novel spatial light modulator and signal processor of the present invention may be employed to provide high-speed, low-light level, deformable mirrors for adaptive optics applications; ultra-high-speed, low-light-level, high-resolution spatial phase and amplitude modulators for optical computing, target recognition, tracking and signal processing; and, among others, ultra-fast, low-light-level, high-resolution detectors for astronomy and for optical communications applications.

What is claimed is:

1. A two-dimensional light modulator comprising a vacuum cell comprising an output port having a two-dimensional signal processing element mounted in said output port;
   a field emitter array for supplying a controlled electron emission located within said vacuum cell and spaced from said signal processing element; and
   a conductive grid for providing a controlled voltage located within said vacuum cell between and spaced from said field emitter array and said signal processing element.

2. A light modulator according to claim 1 wherein said field emitter array comprises a matrix addressed field emitter array having a plurality of horizontal and vertical gates, and including means coupled to said horizontal and vertical gates to selectively activate emitters in said array.

3. A light modulator according to claim 1 wherein said signal processing element comprises a two dimensional optical signal processing element.

4. A light modulator according to claim 3 wherein said signal processing element comprises a spatial light modulator.

5. A light modulator according to claim 4, and including a transparent electrode overlying said optical signal processing element.

6. A light modulator according to claim 3 wherein said signal processing element comprises a deformable mirror.

7. A light modulator according to claim 3 wherein said signal processing element comprises liquid crystals.

8. A light modulator according to claim 3 wherein said signal processing element comprises an organic polymer.

9. A light modulator according to claim 3 wherein said signal processing element comprises inorganic crystals.

10. A light modulator according to claim 1 wherein said signal processing element comprises a two dimensional electronic signal processing device.

11. A light modulator according to claim 10 wherein said signal processing device comprises an array of diodes capable of performing 2-D parallel electrical signal processing.

12. A light modulator according to claim 10 wherein said signal processing device comprises an array of multiplexers capable of performing 2-D parallel electrical signal processing.

13. A light modulator according to claim 10 wherein said signal processing device comprises an array of electronic chips capable of performing 2-D parallel electrical signal processing.

14. A light modulator according to claim 10 wherein said signal processing device comprises a VLSI circuit capable of performing 2-D parallel electrical signal processing.

15. A light modulator according to claim 10, and including a charge transfer plate underlying said two dimensional electronic signal processing device.

16. A light modulator according to claim 3, and including a charge transfer plate underlying said optical signal processing element.

17. A light modulator according to claim 4, and including a charge transfer plate underlying said optical signal processing element and spatial light modulator.

18. A light modulator according to claim 6, and including a charge transfer plate underlying said optical signal processing element.

19. A light modulator according to claim 7, and including a charge transfer plate underlying said optical signal processing element.

20. A light modulator according to claim 8, and including a charge transfer plate underlying said optical signal processing element.

21. A light modulator according to claim 9, and including a charge transfer plate underlying said optical signal processing element.

* * * * *